Feb. 1, 1966 D. C. PRINCE 3,233,226

RECORDING, TRANSLATING, AND RETRIEVING OF INTELLIGENCE

Filed April 24, 1961 2 Sheets-Sheet 1

INVENTOR.
DAVID C. PRINCE
BY Davis, Hoxie, Faithfull & Hapgood
ATTORNEYS.

RECORDING, TRANSLATING, AND RETRIEVING OF INTELLIGENCE

Filed April 24, 1961 2 Sheets-Sheet 2

INVENTOR.
DAVID C. PRINCE
BY
Davis, Hoxie, Faithfull & Hapgood
ATTORNEYS.

United States Patent Office 3,233,226

Patented Feb. 1, 1966

3,233,226

RECORDING, TRANSLATING, AND RETRIEVING OF INTELLIGENCE

David C. Prince, 50 Washington Ave., Schenectady 5, N.Y.

Filed Apr. 24, 1961, Ser. No. 105,191
4 Claims. (Cl. 340—172.5)

This invention relates to a method and apparatus for recording, storing and retrieving of intelligence.

One of the major problems in the recording and retrieving of intelligence has been that the speed of the recording and retrieval apparatus is considerably less than the potential speed of apparatus which may be used to communicate between them. For example, the speed with which punched cards may be scanned and the information printed out by an electric typewriter or teletypewriter is slower than the rate the same information may be transmitted over communication lines. This has resulted in the costly and inefficient non-utilization of a portion of the time and frequency width of communication lines.

Electrostatic printing is one method of attaining a more rapid information retrieval or read-out, particularly of an electronic computer, although the device has been suggested for use in other environments. Such printing, at the present time, requires complex and costly machinery, skilled personnel for its operation and use of special paper. Another solution for a more rapid input of information has been to utilize an intermediate series of machines. For example, a group of punched cards are progressed through a punched card reader which translates the information in one continuous channel onto a magnetic tape. That tape is then run as the input into the computer or communication line at a faster speed than it is recorded. Such intermediate machines are costly to lease or own and require skilled personnel for their operation.

It is an objective of the present invention to provide a novel method of rapidly recording a large amount of intelligence onto a recording medium.

It is a further objective to provide apparatus for such recording which is inexpensive, easy for inexperienced personnel to operate and composed of proven and readily replaceable electrical and mechanical components.

In accordance with the present invention, a plurality of pick-up transducing heads simultaneously with each other scan a body of intelligence. Such pick-up heads are, for example, electromechanical means to feel the holes in a punched card, electro-optical means for sensing such holes or for sensing printed matter, or a magnetic pick-up which is sensitive to the flux changes in a magnetically recorded medium. Each of the pick-up heads produces an electrical variation which is communicated to a recording transducer, with each pick-up head connected to a single recording transducer. The recording transducers are, for example, an electromagnetic head which alters the flux state of a recording tape, an electromechanical punch which produces holes in a tape or an electric typewriter which produces visible symbols on a tape, with or without an associated magnetic code. Each of the recording transducers is physically arranged so that it records on a particular segment of an elongated recording medium.

In accordance with another aspect of this invention, the elongated recorded medium prepared by the device described above may be translated or read-out at a rapid rate. For this purpose, a plurality of reading pick-up transducing heads are physically arranged so that each of the heads reads a particular segment of the recorded medium simultaneously with the other reading heads. Each of the reading heads produces an electrical impulse variation which is transmitted to a symbol producing device, such as an electric typewriter or a punching mechanism for producing punched cards or tape. In this manner segmented portions of the recorded medium may be read simultaneously so that the entire tape is read-out in a fraction of the time required to read-out the tape with a single reading pick-up head.

These and other objects and aspects of the invention will be apparent from the following description of several specific embodiments which refer to the drawings wherein.

Figure 1:
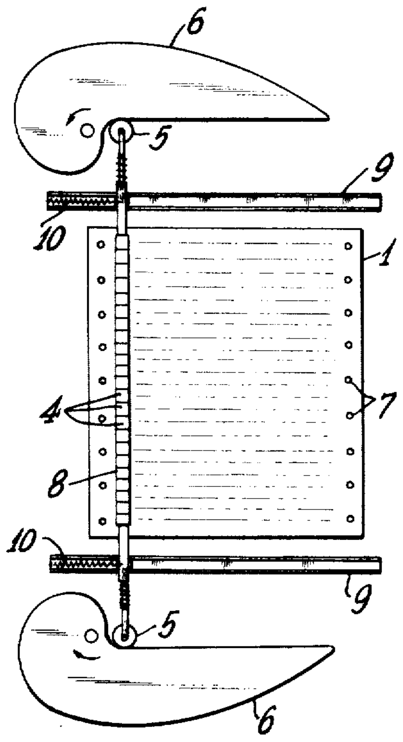
FIGURE 1 is a top plan view of one embodiment of the invention showing the scanning portion of the device.

In FIGURE 1 a paper 1 having on its face a group of intelligence, such as a typewritten report, is in position to be scanned by the plurality of pick-up transducing heads 4. Preferably, there is one pick-up head for each horizontal line of intelligence. In the system described in my issued Patent 2,897,267 the paper 1 is the non-magnetic web having visibly typed letters with a magnetic code for each letter, and the pick-up heads 4 have alternating current applied to their magnetizing core winding. Paper 1 is secured in the selected position by fixed pins being inserted through its marginal holes 7.

The pick-up heads 4 are secured together in an elongated block 8 having rollers 5 at each of two ends. Block 8 slides horizontally along within tracks 9, being held in the tracks by auxiliary rollers. Rollers 5 are pushed in the rightward direction by two cams 6 which operate simultaneously from a continuously running electric motor (not shown). Block 8 is returned to its normal position, at the left, by springs 10 which operate within tracks 9. As an alternative to this device, the block 8 may be fixed and the paper run underneath the block on an endless belt.

Each of the pick-up heads 4 is individually electrically connected to a recording transducing head 11. In certain cases, this connection may be a direct electrical wire, for example, where the pick-up head 4 gives a bridge indication, as set forth in my aforementioned patent, the electrical impulse may be lead directly to a recording head 11 which alters the magnetic state of a tape having magnetically retentive material on its surface. In certain cases, however, it may be necessary to provide amplification of the electrical signal derived from the pick-up head 4. In certain other systems, it may be desirable to change the signal which is sent to the recording head, for example, a code changing device may be interposed between the pick-up head 4 and the recording head 11. As another example, if the pick-up head 4 is an electro-optical system, it may be necessary to compare the optical image with a stored group of images, so that a proper electrical signal may be given to the recording head which would correctly correspond with the viewed symbol on paper 1.

A plurality of heads 11 are arranged in two parallel frame members 12 and 13. The frame members have rollers 14 which may, if the elongated record medium 15 is of sufficient length, be driven by rotating rods from motors. The elongated record medium 15 is threaded about the rollers 14 and about heads 11 from side to side across the frame members 12 and 13. This tape is pulled from take-off spool 16 and is wound upon motor driven take-up spool 17. One example of a suitable elongated record medium is a magnetic recording tape having a magnetically retentive composition on its surface. Another suitable example, although of relatively narrow frequency characteristics, is a magnetic wire. Still another suitable example of a record medium, derived from my aforesaid patent, is a paper tape upon which is imprinted visible signals, along with a magnetic code in low magnetic retentivity material. In that instance, the recording heads 11 would be the platens of electric typewriters having special type bars to imprint the code symbols and using a special magnetic ribbon.

In operation, an operator who may be a relatively unskilled person, threads an elongated medium 15 through the starting rollers 18, around intermediate rollers 14, before each of the recording heads 11, and then on to the take-up spool 17. Through a motor and clutch arrangement (not shown) the take-up spool 17 pulls the record medium 15 the length of the distance between the frame members 12 and 13 during the period that the recording of each page of paper is being made. After recording each page, spool 17 winds the record medium 15 about its axis for storage of the spool or for reading out the information. When a page 1 is removed after being recorded from block 8, the recorded medium 15 corresponding to that page is removed from the recording device.

Figure 2:
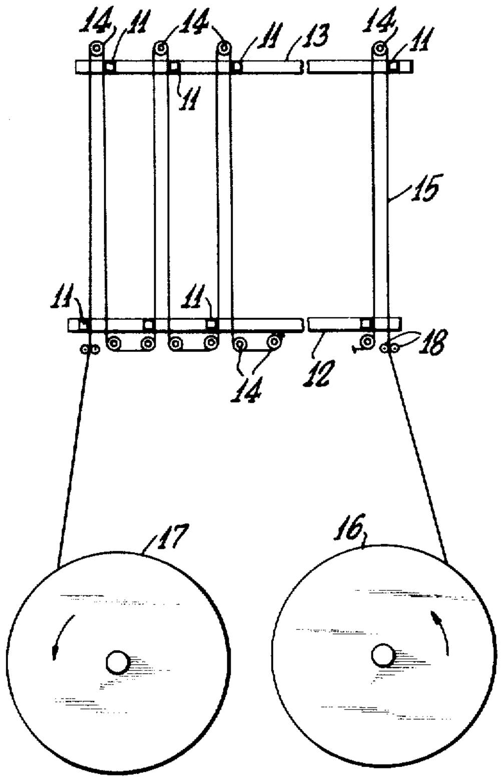
FIGURE 2 is a top plan view of the recording portion which is electrically connected to the scanning portion of FIGURE 1.
Figure 4:
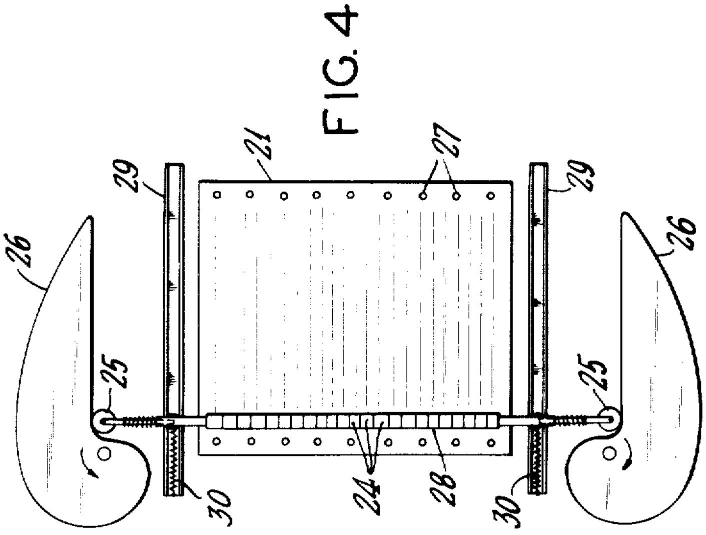
FIGURE 4 is a top plan view of the symbol-producing portion of the read-out mechanism and is electrically connected to the pick-up portion shown in FIGURE 3.
Figure 3:
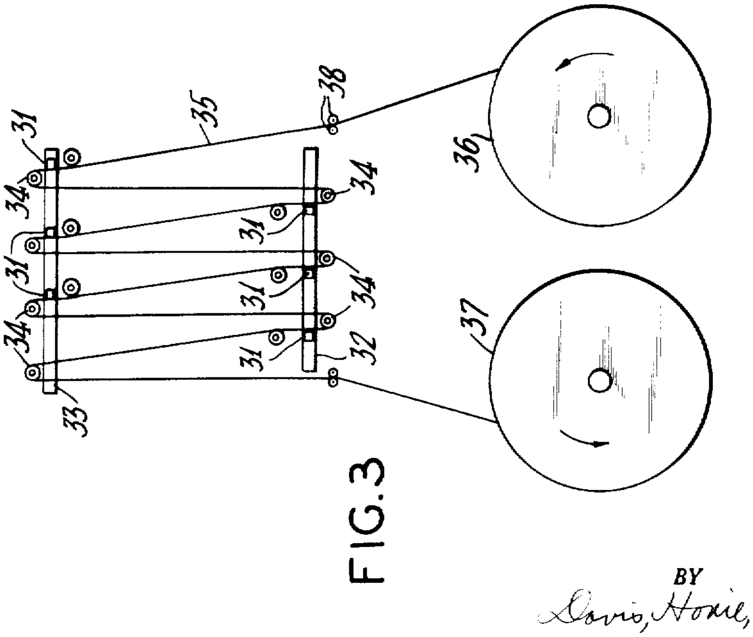
FIGURE 3 is a top plan view of the pick-up portion of the read-out mechanism.

The read-out and printing mechanisms are shown in FIGURES 3 and 4. They are preferably of the same physical construction as the mechanisms described, respectively of FIGURES 2 and 1. By using certain types of transducers in heads 31, corresponding to heads 4, the same mechanism may be utilized for both the pick-up translation and the reading out translation.

The read-out mechanism shown in FIGURE 3 consists of a take-off spool 36 from which an elongated record medium 35 is unwound. A plurality of rollers 34 and of read-out transducing heads 31 are mounted on parallel bars 32 and 33. The medium passes between initial rollers 38 and over and around each of the plurality of rollers 34. The rollers are arranged so that the record medium 35 passes, with the proper spacing, in front of each of the read-out transducing heads 31. The medium is then wound up on motor driven take-up reel 37. If the medium is of sufficient length, either due to the spacing between the bars or to the large number of rollers and their cooperating heads, then the rollers may be driven by a motor so as to reduce the possibility of breakage of the record medium. The record medium, read out by heads 31 is, for example, a tape having on its surface a metallic material of high resistivity, a tape having imprinted characters of low resistivity, a magnetized high-resistivity wire, or a punched paper tape.

Each of the heads 31 produces an electrical variation which is communicated, either directly or indirectly, to a single one of the printing heads 24.

In FIGURE 4 the printing translating device is illustrated. In this device a blank paper 21 is mounted on fixed pins 27 so as to prevent lateral or vertical movement of the paper. An elongated bar 28 having individual printing heads 24 is driven at a uniform speed to the right over the surface of the paper 21 by the pressure exerted on the spring loaded rollers 25, at each of the ends of bar 28, by the cams 26. The cams 26 are driven simultaneously by a motor (not shown). Bar 28 slides horizontally within tracks 29 and is returned to the left by springs 30. The printing heads are, for example, punch mechanisms, in which case the paper 21 is often a stiff thin card or a teletypewritten device, in which case letter symbols would be imprinted on paper 21.

Figure 5:
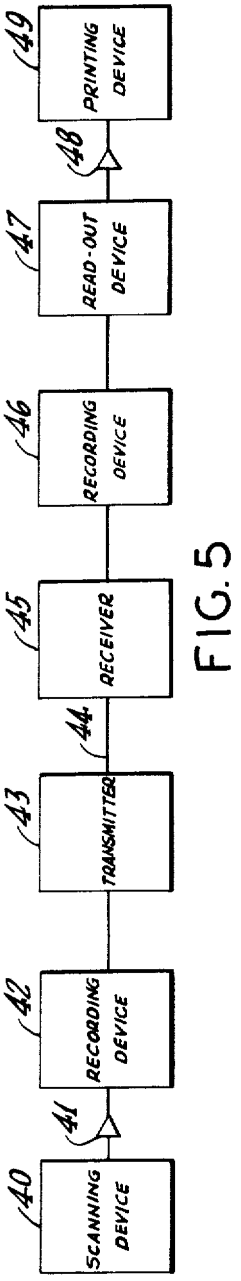
FIGURE 5 is a block circuit diagram of the embodiments of FIGURES 1 and 2, 3 and 4 connected by a communication line.

FIGURE 5, a block schematic diagram, illustrates how the devices described above may be combined to form a complete, rapid and relatively inexpensive communications system. In this system, scanning device 40, described in connection with the drawing of FIGURE 1, translates material on a paper into electrical variations which are amplified by amplifier 41. The amplified signal is fed to a recording device 42, described in connection with FIGURE 2, which translates the electrical variations into an elongated record medium. This record medium is then translated into electrical signal variations by an electrical transmitter 43, for example, a modified telephone headset or a radio broadcasting transmitter. The signal variations are communicated over communication line 44, for example, a telephone line or a radio relay line to receiver 45. Receiver 45, for example, the loudspeaker of a telephone handset or a radio receiver, translates the signal variations into sound or other recordable signal; that signal is then recorded on an elongated record medium by recording device 46.

The elongated record medium is then placed on a read-out device 47, described in connection with FIGURE 3, producing electric signal variations which are amplified by amplifier 48 and communicated to printing device 49, described in connection with FIGURE 4. By utilizing this system, the speed of transmission on communication line 44 may be made much greater than the recording and read-out speeds. This faster speed is obtained by running the elongated record medium to transmit at a faster speed in the transmitting station 43 and subsequently running it at a lower speed in read-out device station 47. For example, the recording of a tape is at 3.75 inches per second in recording device 42 and it is then transmitted at the rate of 15 inches per second, both being standard speeds. As an alternative, a narrow band-width of the communication channel, compared to continuous communication between recording device 42 and recording device 46, may be attained by running the record medium at a slower speed in the transmitter than it was recorded upon in the recording device 42. By this alternative, transmission takes place during the period that pages are being changed in scanning device 40 and that record mediums are being changed in recording device 42.

It should be understood that the present disclosure is for the purpose of illustration only and that this invention includes all modifications and equivalents which fall within the scope of the appended claims.

I claim:

1. Apparatus for the translation and storage of a group of information including a plurality of pick-up transducing heads, means to move the pick-up transducers relative to the information so as to scan a continuous group of information, each pick-up transducer being positioned to scan a segmented sub-group of the group simultaneously with the scanning by the other pick-up transducers of other segmented sub-groups, a plurality of number $n$ of recording transducers, a plurality of communication means each of which means connects a single one of the pick-up heads to a single one of the recording transducers in a one-to-one relationship, means to move an elongated record medium relative to the recording transducers a distance $d$ during the recording of each group of information, and means to move the record medium $n-1$ times $d$ distance before recording a second group of information; wherein the recording transducers are positioned in consecutive arrangement in tandem along the length of the record medium to simultaneously record the information of each sub-group onto separate consecutive segments along the length of the elongated record medium.

2. A system for the translation and reproduction of a group of information including a plurality of pick-up transducing heads, means to move the pick-up transducers relative to the information so as to scan a continuous group of information, each pick-up transducer being positioned to scan a segmented sub-group of the group simultaneously with the scanning by the other pick-up transducers of other segmented sub-groups, a plurality of number $n$ recording transducers, a plurality of communication means, each of which means connects a single one of the pick-up heads to a single one of the recording transducers in a one-to-one relationship, means to move a first elongated record medium relative to the recording transducers a distance $d$ during the recording of each group of information, and means to move the record medium $n-1$ times $d$ distance before recording a second group of information; wherein the recording transducers are positioned in consecutive arrangement in tandem along the length of the record medium to simultaneously record the information of each sub-group onto different consecutive segments along the length of the first elongated record medium, means to translate the information on the first record medium into electrical variations at a faster rate than any of the pick-up heads scans the original information, a transmitter to communicate the electrical variations, a receiver to receive the communicated variations, a recording device to record the variations, and a read-out device to translate the variations into an ordered sequence of symbols representing the information, wherein the read-out device operates at a slower rate than the recording device.

3. Apparatus as in claim 1 wherein the pick-up heads have electromechanical fingers and produce electrical variations and the recording transducers are magnetic heads which translate those electrical variations into magnetic flux changes.

4. Apparatus as in claim 1 wherein the recording heads are mounted on parallel bars which also have rollers for the record medium, and the record medium moving means includes a motor driving a take-up pulley.

References Cited by the Examiner

UNITED STATES PATENTS 2,990,538 6/1961 Weidenhammer ---- 340—172.5

ROBERT C. BAILEY, *Primary Examiner.*

MALCOLM A. MORRISON, *Examiner.*